May 30, 1967     V. LEADER     3,321,893
CUTTINGS AND DEBRIS CATCHER BAG ATTACHMENT
FOR ROTARY TYPE LAWN MOWER
Filed Aug. 2, 1965

INVENTOR.
VICTOR LEADER
BY
Braddock+Burd
ATTORNEYS

3,321,893
CUTTINGS AND DEBRIS CATCHER BAG ATTACHMENT FOR ROTARY TYPE LAWN MOWER

Victor Leader, Minneapolis, Minn., assignor to Leader Farms, Inc., Minneapolis, Minn., a corporation of Minnesota
Filed Aug. 2, 1965, Ser. No. 476,632
7 Claims. (Cl. 56—202)

This is an improvement over the device set forth in my application Ser. No. 349,429, filed Mar. 4, 1964, now Patent 3,212,248, for a Grass Cuttings and Debris Catcher Bag Attachment for Rotary Type Lawn Mower.

This invention relates to an improvement in a grass clippings and debris collector in which a rigid member is employed to support a disposable bag and to further provide a permanent rigid non-expendable baffle as outlined in non-rigid expendable form in the parent application.

By providing a discharge extension, and a permanent bag retaining housing, which housing includes a baffle, a less complicated and, thus, less expensive bag may be used to practice the invention. Also the bag may be readily secured to the mower without the necessity of shutting off the engine of the mower, since the connection is sufficiently displaced from the rapidly whirling mower blade to insure safety to the operator.

Referring now to the drawings.

Figure 1:
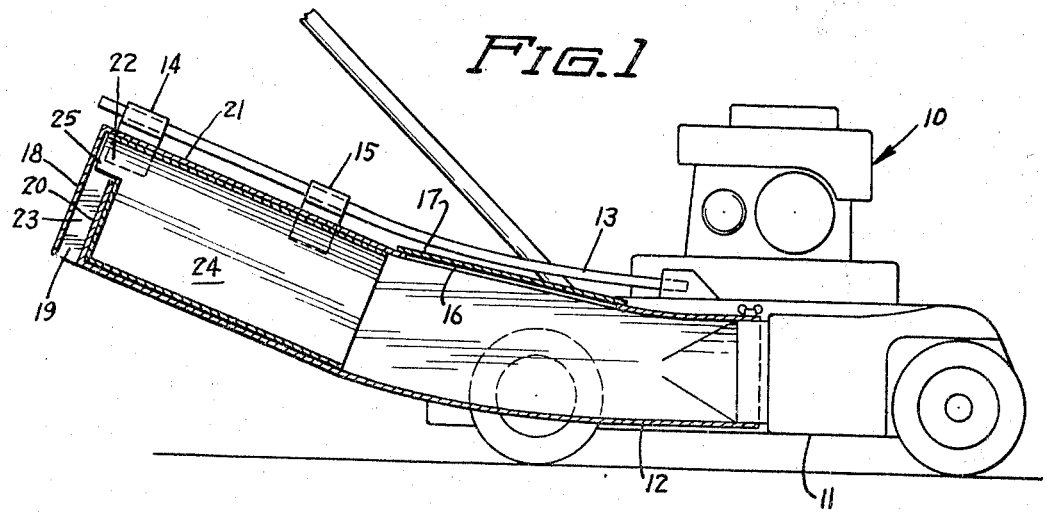
FIGURE 1 depicts a side elevation in section of an embodiment of this invention mounted on a rotary type power mower.
Figure 2:
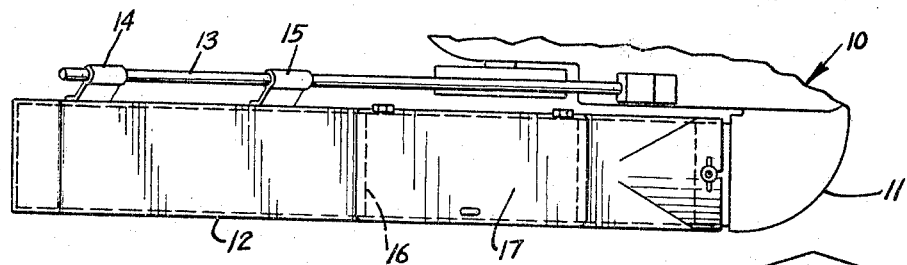
FIGURE 2 is a plan view of the device of FIGURE 1 drawn to the same scale as FIGURE 1.
Figure 3:
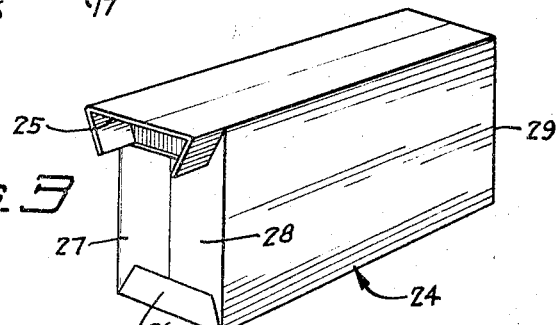
FIGURE 3 is a perspective view of a bag as would be used with this embodiment.

Referring now to FIGURE 1, a rotary type power lawn mower 10 has a discharge passageway 11 through which the grass clippings and debris picked up by mower 10 are thrown. An elongated discharge extension 12 is secured to discharge passageway 11. Elongated discharge extension 12 is preferably rectangular in cross-section, although other cross-sections may be suitable. When a rectangular cross-section is employed bags are more easily provided.

A support bar 13 is secured to mower 10 to provide adequate support for the rearward end of elongated discharge extension 12. Such support is obtained by providing a pair of brackets 14 and 15 rigidly secured to discharge extension 12 and embracing support bar 13. An access opening 16 is provided in the top surface of discharge extension 12 to allow removal of grass clippings and debris. A cover 17 is shown hinged to discharge extension 12 to cover access opening 16.

A rearward end 18 of discharge extension 12 is closed. A downwardly opening port 19 is positioned adjacent rearward end 18. A baffle 20 is secured within discharge extension 12 and is positioned at the forward edge of port 19 extending upwardly into proximity with top surface 21 of discharge extension 12. Baffle 20 completely closes, transversely, discharge extension 12 with the exception of an air passage 22 over the top of baffle 20. It will be noted that a continuous air channel is provided over the top of baffle 20, into a duct 23, formed between rearward end 18 and baffle 20, and out port 19.

A bag 24, with which this device is used, is a modification of a standard paper variety having folded and pasted bottoms. The usual bag 24 has a pair of short flaps 25 and 26 glued to a pair of long flaps 27 and 28. However, in the present invention short flap 26 is glued to long flaps 27 and 28, but short flap 25 is not so glued and may be opened to provide a port which communicates with air passage 22 when bag 24 is inserted into discharge extension 12. It will be seen that the open area made by opening flap 25 is less than 50% of the area of the bag bottom.

In use, flap 25 of bag 24 is pulled open. Cover 17 is raised to permit access to opening 16. Bag 24 is inserted with flap 25 pointed rearwardly and upwardly until the bottom of bag 24 abuts baffle 20, which lends support to the bag bottom. Cover 17 is then closed and mower 10 is operated. Grass clippings and debris are thrown into discharge extension 12 and are carried upwardly into bag 24 by the air stream generated by mower 10. The grass laden air will impinge against the bottom of bag 24, which bottom is supported by baffle 20. The laden air will then release the grass clippings and debris in the bag and continue freely over baffle 20 through air passage 22, into air duct 23, and out port 19 to the atmosphere. When bag 24 has been filled with grass and debris one merely opens cover 17, crumples a mouth 29 of bag 24 to prevent escape of debris and grass clippings, and pulls bag 24 out of access opening 16. As bag 24 is being removed, flap 25 is bent downward to seal the opening in the bottom of bag 24. Bag 24 is then disposed of and a fresh bag 24 is inserted.

Figure 4:
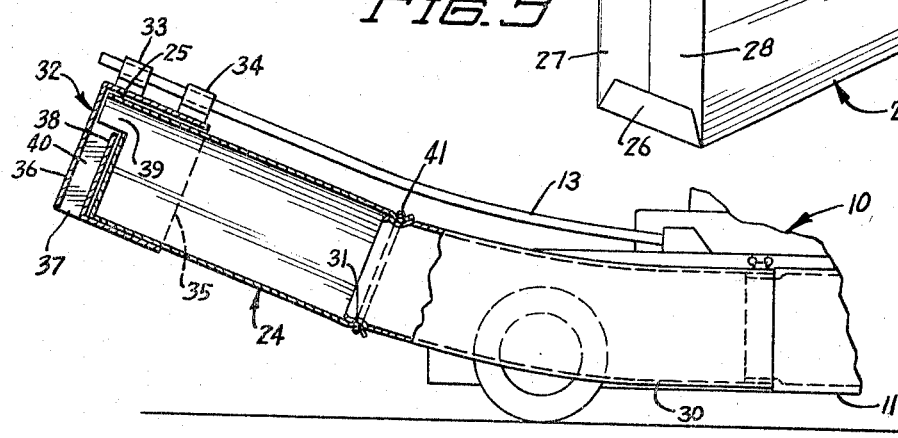
FIGURE 4 is a side elevation of another embodiment of the invention.

Another form of this invention is shown in FIGURE 4, where a relatively short discharge extension 30 is secured to discharge passage 11 of mower 10. Discharge extension 30 is rearwardly disposed and its rearward opening is formed with an indent 31.

A bag retaining housing 32 is secured to support bar 13 by any suitable means such as by a pair of brackets 33 and 34. Bag retaining housing 32 is comprised of a hollow box-shaped member. The forward end of bag retaining housing 32 defines an opening 35. Opening 35 is disposed to be in alignment with and spaced apart from the rearward opening of discharge extension 30. Bag retaining housing 32 has a closed rearward end 36. A downwardly opening port 37 is provided in the bottom of bag retaining housing 32 adjacent rearward end 36. Baffle means 38 are secured within bag retaining housing 32 approximately parallel to rearward end 36 just forward of open port 37. Baffle means 38 extend upwardly from the bottom of bag retaining housing 32 into proximity with the top of bag retaining housing 32. Baffle means 38 close bag retaining housing 32 with the exception of the air passage 39 above baffle means 38. It will be noted, that as air is forced through bag retaining housing 32 the air is free to pass into air passage 39 and thence to duct 40, formed between rearward end 36 and baffle means 38, and outwardly to the atmosphere via open port 37.

In this modification of the invention, a bag 24, similar to that used in the device of FIGURE 1, is employed. A further advantage of this modification is that a bag of a soft flexible nature may be used.

In use, bag mouth 29 is slipped over indent 31 of discharge extension 30. Bag 24 is retained in position by any convenient means. One very suitable means is demonstrated by a resilient band 41 which presses the material of bag 24 against indent 31, holding bag 24 tightly in place. Resilient band 41 then will retain bag 24 in position, against air pressure from mower 10. Flap 25 fits into air passage 39 to provide an opening from bag 24 to port 37 via air duct 40. When the mower is operated, grass clippings and debris thrown out through discharge passageway 11 will pass through discharge extension 30 into bag 24. The grass laden air will impinge on baffle means 38 and will drop the grass clippings and debris in the bag. The unburdened air is now free to continue on through air passage 39, air duct 40 and finally out to the atmosphere 37.

When bag 24 has been filled it is a simple matter to release it by taking off resilient band 41 and crumpling mouth 29 to prevent the escape of grass clippings. Bag 24 is then discarded and a fresh bag 24 inserted.

It will be appreciated that because of the remote position of the outlet of discharge extension 30 from the rapidly whirling blades of mower 10 that it is not necessary to shut off the motor while changing bags 24.

What is claimed is:

1. On a lawn mower of the rotary type having a laterally disposed passageway for the discharge of grass clippings and debris, the improvement in a grass clippings and debris collector comprising:

a rigidly elongated enclosed discharge extension secured to the mower in communication with the discharge passageway of the mower, said discharge extension being rearwardly disposed and closed at a rearward end, said discharge extension having a downwardly opening port adjacent said rearward end of said discharge extension;

baffle means transversely positioned in said discharge extension forward of and adjacent to the port in said discharge extension, said baffle means extending upwardly into proximity with the upper portion of said discharge extension, thereby providing a vertically disposed air passageway to afford free circulation of the air stream induced by the lawn mower over the upper edge of the baffle means, downwardly through the vertically disposed air passageway, and out to the atmosphere through the open port.

2. The grass clippings and debris collector of claim 1 wherein said elongated enclosed discharge extension includes an access port and a cover removably attached to said discharge extension for selectively opening said access port to allow emptying of grass clippings and debris collected in said discharge extension.

3. The grass clippings and debris collector of claim 2 wherein a disposable bag is secured within said discharge extension, said bag including a partially open end, the opening of said partially open end being adapted to communicate with the air passageway formed by said baffle means and said discharge extension, said bag being dimensioned to permit removal of said bag when full of grass clippings and debris, through the access port.

4. A grass clippings and debris bag retaining housing adapted to be secured to a rotary type power mower, the housing including:

a hollow container having sides and a rear wall, a front of said hollow container being open to form a bag receiving mouth, a bottom side including an open port adjacent said rear wall of said hollow container;

and a baffle secured within said hollow container, said baffle being approximately parallel to said rear wall and adjacent the forward end of the open port, said baffle extended from the bottom of said hollow container into proximity with the top of said hollow container to allow free passage of air forced into the front end of said hollow container over the top of said baffle into the passage formed by the rear wall and said baffle and out said open port.

5. A grass clippings and debris collecting bag holder comprising:

a hollow box shaped member adapted to be secured to a rotary type lawn mower, said box shaped member being open at a forward end, and having an open port on a bottom of said box shaped member adjacent a rear end; and a baffle secured within said box shaped member, said baffle extending upwardly from a point adjacent the forward end of said port into proximity with the top of said box shaped member, said baffle being of the same width as said box shaped member.

6. Means for collecting grass clippings and debris thrown from a rotary type power lawn mower through a laterally disposed discharge passageway, the means comprising:

an elongated extension secured to the mower in communication with the discharge passageway, said discharge extension being disposed rearwardly;

an indent formed about the rear circumference of said discharge extension;

a bag retaining housing comprising a hollow box secured to the mower, said box being open at a forward end and disposed so that the open end of said box is in spaced apart alignment with a rearward end of said discharge extension, said hollow box having a downwardly opening port adjacent the rearward end of said hollow box, and a baffle secured within said hollow box adjacent the forward end of the downwardly opening port, the baffle extending upwardly into proximity with the top of said hollow box to transversely close said hollow box except for an air passageway over the top of said baffle;

a bag having a mouth adapted to embrace the rearward end of said discharge extension, said bag having a partially closed end, engaged by said bag retaining housing, said partially closed end adapted to abut said baffle so that the opening of said partially closed end is in communication with the air passageway over the top of said baffle; and a resilient band for pressing said bag mouth against said discharge extension, said resilient band being selectively retained by said indent.

7. Means for collecting grass clippings and debris discharged from a rotary lawn mower comprising: a hollow container having sides and a rear wall, a front of said container being open to form a bag receiving mouth, a bottom side including an open port adjacent said rear wall of said hollow container, a baffle secured within said container, said baffle extended from the bottom of said container into proximity with the top of said container to provide an opening to allow free passage of air through the container, and a bag having a mouth at a forward end of the bag for receiving grass clippings and debris discharged from said mower, said bag having a rear end located adjacent the forward side of said baffle, said rear end having an opening adjacent the top edge of said bag in alignment with the opening above said baffle, said bag having flap means extended rearwardly from the rear end over the baffle into the top portion of the passage formed by the rear wall and said baffle of the container whereby air flows through the bag and into the passage and out said open port.

References Cited
UNITED STATES PATENTS

| | | | |
|---|---|---|---|
| 948,082 | 2/1910 | Wickwire | 55—373 X |
| 1,029,783 | 6/1912 | Appel | 229—59 |
| 2,078,467 | 4/1937 | Sterling | 229—59 |
| 2,918,694 | 12/1959 | Tarrant | 56—202 X |
| 3,050,235 | 8/1962 | Tomson | 229—62.5 |

ANTONIO F. GUIDA, *Acting Primary Examiner.*

ABRAHAM G. STONE, RUSSELL R. KINSEY,
*Examiners.*